May 29, 1951   H. J. BUTLER   2,555,183
COOLED FRICTION DISK
Filed Oct. 19, 1948

INVENTOR
Henry James Butler
by Benj. T. Rauber
his attorney

UNITED STATES PATENT OFFICE 2,555,183

COOLED FRICTION DISK

Henry James Butler, Sutton Coldfield, England, assignor to Dunlop Rubber Company Limited, London, England, a British company Application October 19, 1948, Serial No. 55,249
In Great Britain November 12, 1947

4 Claims. (Cl. 188—264)

This invention relates to cooled friction disk, particularly brakes of the disc type.

Disc brakes are well known, particularly in connection with aircraft, in which one or more annular discs associated with a rotatable portion of a wheel assembly and adapted to be rotated by said assembly are located between friction members associated with a non-rotatable portion of the assembly, means being provided to effect frictional engagement between the said members and discs when it is desired to apply the brakes.

A serious defect of disc brakes, which is particularly evident when they are employed on modern aircraft of considerable weight and high landing speeds, is that the heat developed by friction during the braking operation is liable to cause distortion of the discs and thus render the brakes unreliable or even inoperative.

It has been found that the distortion of a brake disc is largely due to uneven stresses in the braking surface arising from temperature changes and that the effects of this distortion can largely be reduced by localising the affected areas.

It is the object of this invention to provide an improved brake disc that is less liable to distort on account of temperature changes in the braking surface than discs of normal construction.

According to the invention a brake disc comprises a plurality of braking blocks connected by arcuate elements spaced axially apart from one another to form an annular built-up structure.

The arcuate elements may be joined to the braking blocks by riveting or welding. Preferably the arcuate elements are in two or more rows axially spaced apart to provide an augmented cooling surface for the annular disc. The built-up discs of the present invention are particularly suited for brakes which have isolated pressure pads.

In order that the invention may be more fully described, reference is made to the following drawings in which.

Figures 1, 2:
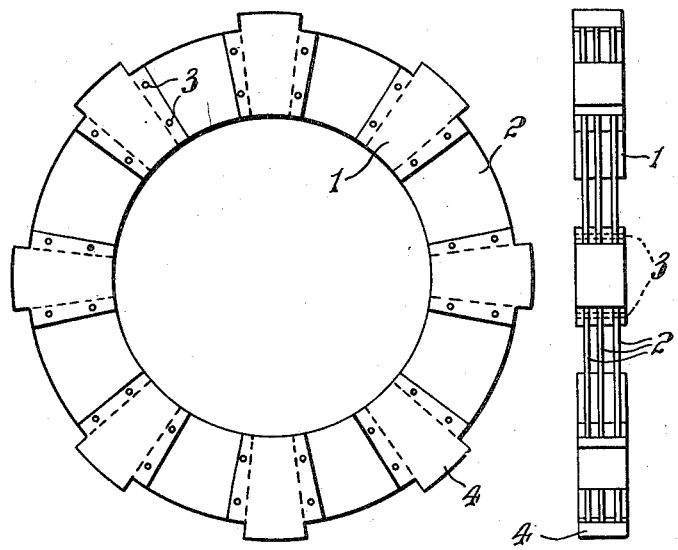
Fig. 1 is a plan view of a brake disc made in accordance with this invention.
Fig. 2 is a side elevation of Fig. 1.

In one embodiment of the invention, shown in Figs. 1 and 2, a brake disc is built up from eight sector-shaped blocks 1, each of which has a pair of radially inclined faces subtending an angle of about 22½° and eight sets of arcuate plates, each set comprising three plates 2, the ends of which rest in complementary slots in the opposing radial faces of the adjacent blocks. The plates are united to the blocks by rivets 3 and the assembly forms an annular disc having friction surfaces formed by the end of the blocks.

Each block is provided, on one of its peripheral faces with a driving lug 4 adapted to engage with a complementary slot on the rotatable portion of the wheel assembly with which the disc is to be associated. This lug projects from the outer or inner peripheral face of the block according to whether the disc is to be driven through slots surrounding its outer periphery or within its inner periphery.

Figures 3, 4:
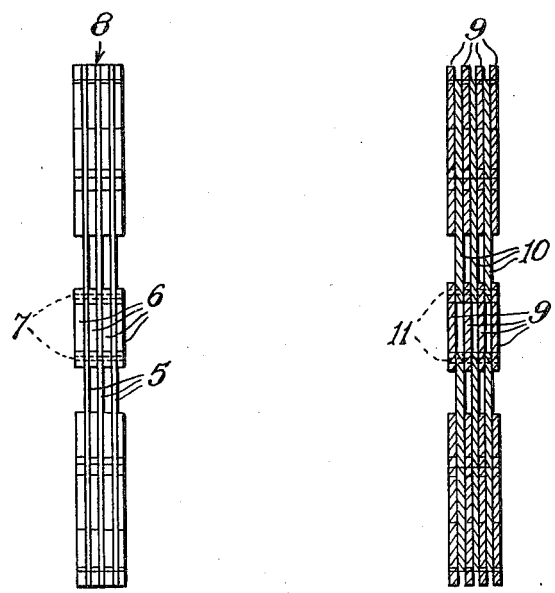
Figs. 3 and 4 are side elevations of a brake disc showing alternative forms of construction.

In the second embodiment of the invention, which is broadly similar to that already described, the disc, Fig. 3 consists of three annuli 5 and eight sets of sector shaped plates 6, spaced equiangularly around the annuli. Each set comprises four plates, two of which are located between the central annulus and the annulus on each side thereof, the other two being located on the outside of the outer annuli. The plates and the annuli are secured together by rivets 7, thus forming a structure similar to that of the first embodiment. Driving lugs 8 are provided on the inner or outer periphery of the disc as required, by suitable projecting portions of the annuli and plates.

According to a third embodiment of the invention, the discs in Fig. 4 are formed from a number of sector-shaped plates having radial faces. The plates are of two kinds, one of which is provided with a projection on the outer or the inner peripheral face as required to form a driving lug, and which will be referred to as "lug plates" 9, and the other of which is without such projections and has arcuate inner and outer peripheral faces. This kind will be referred to as "plain plates" 10. The complete disc is made up from four sets of lug plates spaced axially by three sets of plain plates, each set of lug and plain plates consisting of the same number of plates e. g. eight. The plates in each set of lug plates are spaced equiangularly and are opposite the corresponding plates in the other sets. Similarly the plates in each set of plain plates are spaced equiangularly and are opposite the corresponding plates in the other sets. The lug plates are displaced circumferentially with respect to the plain plates, so that only the marginal radially inclined portions of the two types of plate overlap, the plates being joined together by rivets 11 passing through these overlapping portions. The discs therefor contain a plurality of air passages extending radially between its internal and external peripheral faces and formed by the radial faces of the adjacent plates of each set and the opposite faces of alternate sets of plates.

In all three embodiments, the parts of the discs may be welded together, and not riveted as described.

The disc according to the invention may be made of steel with facings of graphitic cast iron on the friction surfaces as described in application Serial No. 14,655, filed March 13, 1948, now abandoned, or of copper or of copper alloy as described in application Serial No. 38,704, filed July 14, 1948, now abandoned, or they may be made throughout with copper or a copper alloy as described in application Serial No. 38,704, filed July 14, 1948.

Having described my invention what I claim is:

1. A brake disc which comprises a plurality of circumferentially spaced sets of sector-shaped friction members, the members in each set being axially spaced apart, and a plurality of circumferentially spaced sets of connecting members intermediate the sets of friction members, the members in each set being axially spaced apart and the ends of said members being secured between the ends of adjacent friction members.

2. A brake disc which comprises a plurality of circumferentially spaced sets of sector-shaped friction members, the members in each set being axially spaced apart and a plurality of annular connecting members spacing the friction members of each set apart and secured thereto.

3. A brake disc which comprises a plurality of sets of sector shaped friction members and connecting members in the spaces between and connecting said sets of friction members, said connecting members each comprising plates spaced axially and spacing axially the friction members of said sets of friction members.

4. The brake disc of claim 3 in which the connecting members comprise sector shaped plates, the adjacent edges of the friction members of each set being interleaved with the sector shaped members of the connecting members.

HENRY JAMES BUTLER.

REFERENCES CITED

The following references are of record in the file of this patent:

UNITED STATES PATENTS

| Number | Name | Date |
|---|---|---|
| 474,183 | Neuert | May 3, 1892 |
| 1,594,438 | Whitacre | Aug. 3, 1926 |
| 1,808,511 | Robbins | June 2, 1931 |
| 2,024,328 | Batie | Dec. 17, 1935 |
| 2,044,989 | La Brie | Jan. 26, 1937 |
| 2,105,867 | Stewart | Jan. 18, 1938 |
| 2,247,298 | Kattwinkel | June 24, 1941 |
| 2,262,709 | Lambert | Nov. 11, 1941 |

FOREIGN PATENTS

| Number | Country | Date |
|---|---|---|
| 314,425 | Italy | Jan. 26, 1934 |
| 594,921 | Great Britain | Nov. 21, 1947 |